(12) United States Patent
Raghavan et al.

(10) Patent No.: US 11,356,159 B1
(45) Date of Patent: Jun. 7, 2022

(54) METHODS FOR ADAPTING INTER-ANTENNA ELEMENT SPACINGS IN ULTRA WIDE BANDWIDTH OPERATIONS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/315,227

(22) Filed: May 7, 2021

(51) Int. Cl.
  *H04B 7/06*  (2006.01)
  *H04B 17/345* (2015.01)
  *H04B 17/318* (2015.01)

(52) U.S. Cl.
  CPC ........... *H04B 7/061* (2013.01); *H04B 7/0617* (2013.01); *H04B 17/318* (2015.01); *H04B 17/345* (2015.01)

(58) Field of Classification Search
  CPC .... H04B 7/061; H04B 7/0617; H04B 17/318; H04B 17/345
  USPC ......................................................... 375/267
  See application file for complete search history.

(56) References Cited

U.S. PATENT DOCUMENTS

| | | | | |
|---|---|---|---|---|
| 8,965,680 B2 * | 2/2015 | Wang | ...................... | H01Q 21/20 343/705 |
| 2021/0384961 A1 * | 12/2021 | Park | ........................ | H01Q 3/24 |

* cited by examiner

*Primary Examiner* — Fitwi Y Hailegiorgis
(74) *Attorney, Agent, or Firm* — Patterson + Sheridan, LLP

(57) ABSTRACT

Aspects of the present disclosure provide wireless devices, apparatuses, methods, processing systems, and computer readable mediums for adapting inter-antenna element spacings. An example method generally includes activating a first subset of antenna elements from within a set of antenna elements, communicating with at least a second wireless device with the first subset of antenna elements activated, receiving feedback from at least the second wireless device, and activating a second subset of antenna elements from within the set of antenna elements, based on the feedback, wherein the second subset of antenna elements has at least one different inter-antenna element spacing than the first subset of antenna elements in at least one dimension.

28 Claims, 9 Drawing Sheets

METHODS FOR ADAPTING INTER-ANTENNA ELEMENT SPACINGS IN ULTRA WIDE BANDWIDTH OPERATIONS

TECHNICAL FIELD

Aspects of the present disclosure relate to wireless communications, and more particularly, to techniques for selectively enabling antenna elements to adapt inter-antenna element spacings.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices or wireless nodes to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, further improvements, e.g., improvements in latency, reliability, and the like, in NR and LTE technology remain useful. Preferably, these improvements should be applicable to other multi-access technologies and the telecommunication standards that employ these technologies.

One approach to increase performance is using wide bandwidths in what is often referred to as "upper millimeter wave bands" (e.g., 52.6 GHz and beyond), which may allow for significant performance and beamforming gains. Certain challenges exist, however, when operating in such bandwidths. For example, many devices may have limited resources to make a small number of radio frequency (RF) chains. For example, some devices may have a single RF chain that may constrain analog/RF beamforming, which can lead to poor performance at certain frequencies.

SUMMARY

The systems, methods, and devices of the disclosure each have several innovative aspects, no single one of which is solely responsible for the desirable attributes.

One innovative aspect of the subject matter described in this disclosure can be implemented in a method for wireless communications by a user equipment (UE). The method generally includes activating a first subset of antenna elements from within a set of antenna elements (which forms a "baseline antenna array"), communicating with at least a second wireless device with the first subset of antenna elements activated, receiving feedback from at least the second wireless device, and activating a second subset of antenna elements from within the set of antenna elements/ "baseline antenna array", based on the feedback, wherein the second subset of antenna elements has a different inter-antenna element spacing than the first subset of antenna elements in at least one dimension.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 4 illustrates example operations that may be performed by a user equipment (UE) to identify a default beam to use for receiving a physical downlink shared channel (PDSCH), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to techniques for selectively enabling antenna elements to adapt inter-antenna element spacings.

In some cases, a wireless device operating in millimeter wave bands may change inter-antenna element spacings by changing from a first subset of activated antenna elements, from within a larger set of antenna elements (denoted as a "baseline antenna array" in this present disclosure), to a second subset of activated antenna elements. In some cases, the second subset may be chosen to have inter-antenna element spacings in one or more directions different from the first subset so as to realize performance tradeoffs, in response to feedback from at least a second wireless device.

The following description provides examples of adapting inter-antenna element spacings, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
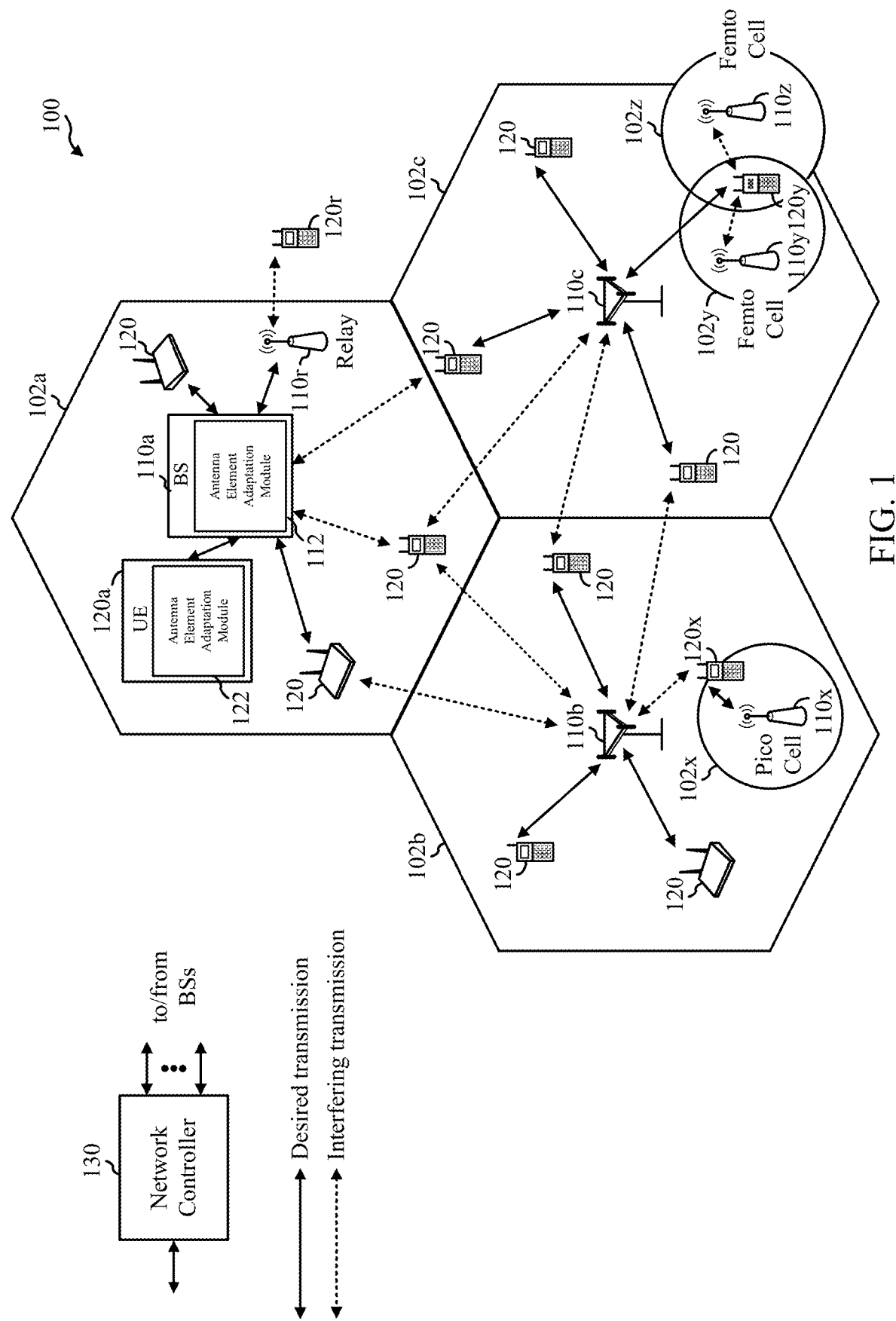
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include an antenna element adaptation module 122 that may be configured to perform (or cause UE 120a to perform) operations 500 of FIG. 5. Similarly, a base station 110a may include an antenna element adaptation module 112 that may be configured to perform operations 500 of FIG. 5.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 24.25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
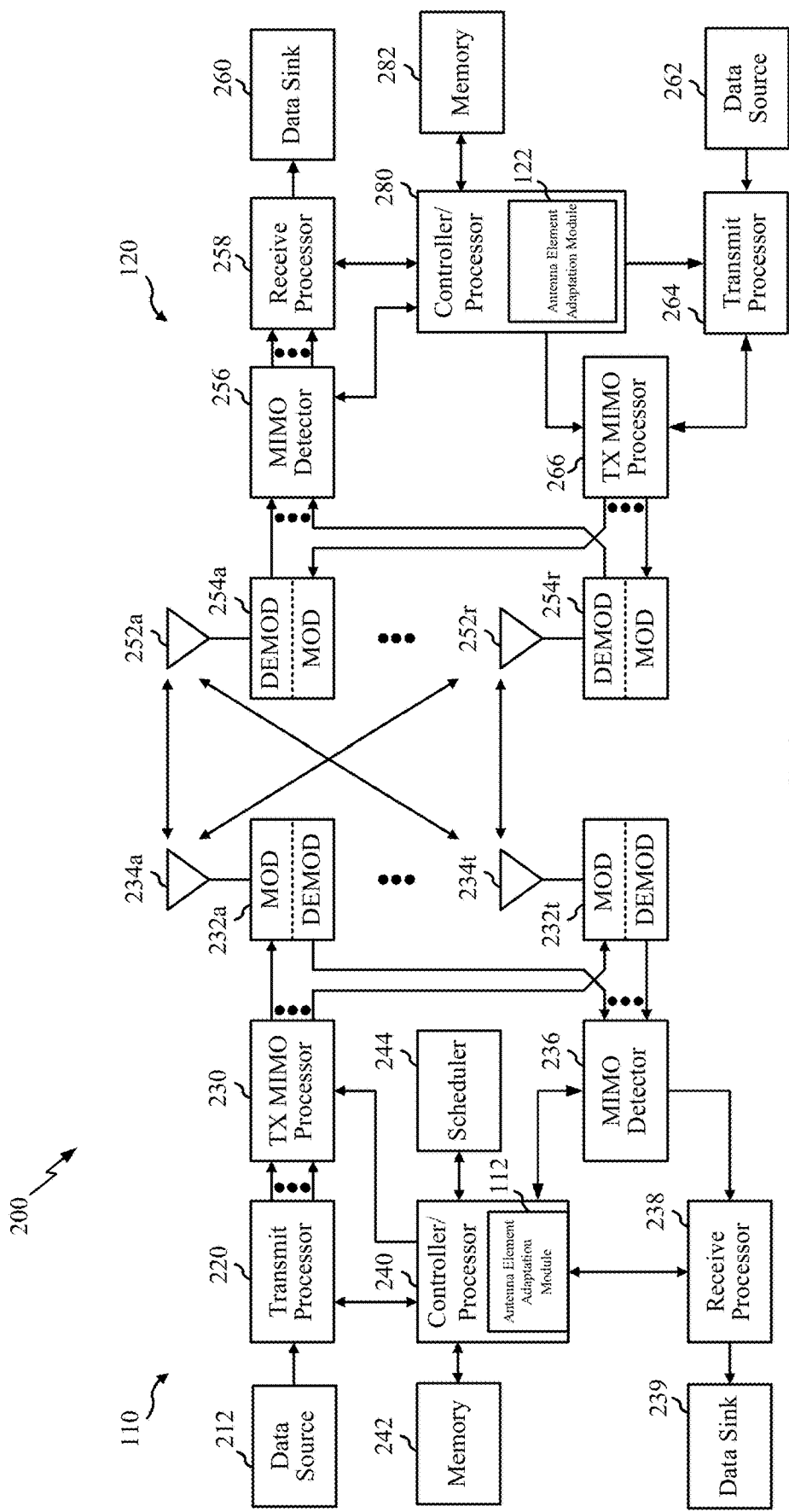
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink. In one example, memory 282 or memory 242 can be a non-transitory computer-readable medium comprising instructions (e.g., instructions that instruct a processor, e.g., controller/processor 680, controller/processor 640, or other processor) to perform any aspects of FIG. 4 or FIG. 5. Additionally or alternatively, such instructions may be copied or installed onto memory 282 or memory 242 from a non-transitory computer-readable medium.

The controller/processor 280 or other processors and modules at the UE 120 may perform or direct the execution of processes for the techniques described herein. As shown in FIG. 2, the controller/processor 280 of the UE 120 an antenna element adaptation module 122 that may be configured to perform operations 500 of FIG. 5, as discussed in further detail below. The controller/processor 240 of the base station 110 includes an antenna element adaptation module 112 that may be configured to perform operations 500 of FIG. 5, as discussed in further detail below. Although shown at the Controller/Processor, other components of the UE or BS may be used to perform the operations described herein.

Figure 3:
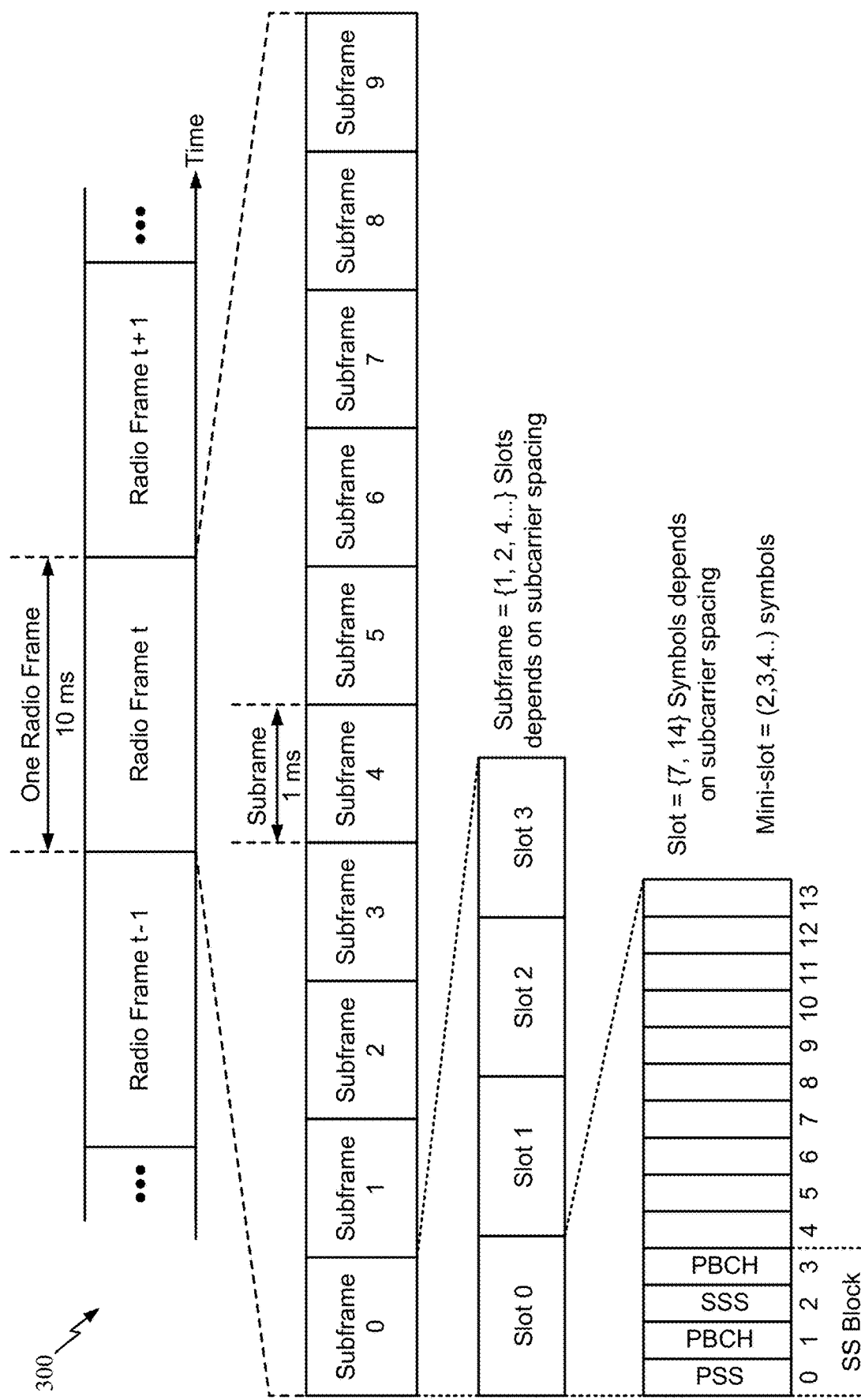
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Introduction to Millimeter Wave Bands

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations—FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Example Methods for Adapting Inter-Antenna Element Spacing

Aspects of the present disclosure relate to wireless communications, and more particularly, to techniques for selectively enabling antenna elements to adapt inter-antenna element spacings.

FR4 frequency bands may be referred to as "upper millimeter wave bands" or also as the "sub-THz regime." Since the wavelengths, λ, at upper millimeter wave bands are smaller than λ, at FR2 (e.g., 28 or 39 GHz), more antenna elements can be packed in the same physical aperture in FR4 than at FR2, allowing for large antenna arrays. Extensions to even higher carrier frequencies are possible in future 3GPP releases.

In the range of 52.6 GHz to 71 GHz (FR4-1), an approximate 14 GHz wide bandwidth is available across multiple geographies (57-71 GHz), allowing for significant performance/beamforming gains. As noted above, however, in many devices, a single antenna module/panel over a single RF chain is likely to be used over this approximate 14 GHz/ultra wide bandwidth range. Since a single RF chain uses a single set of phase shifters, mixers or up/down-converters, analog-to-digital converters and digital-to-analog converters, analog/RF beamforming is constrained and can lead to poor performance at certain frequencies.

Typically, an antenna array has a fixed spacing between antenna elements (a fixed set of inter-antenna element spacings). There are many scenarios, however, where a different inter-antenna element spacing may be worthwhile. Aspects of the present disclosure propose techniques for dynamically adapting inter-antenna element spacings, which may help improve performance for these different scenarios.

Figure 4:
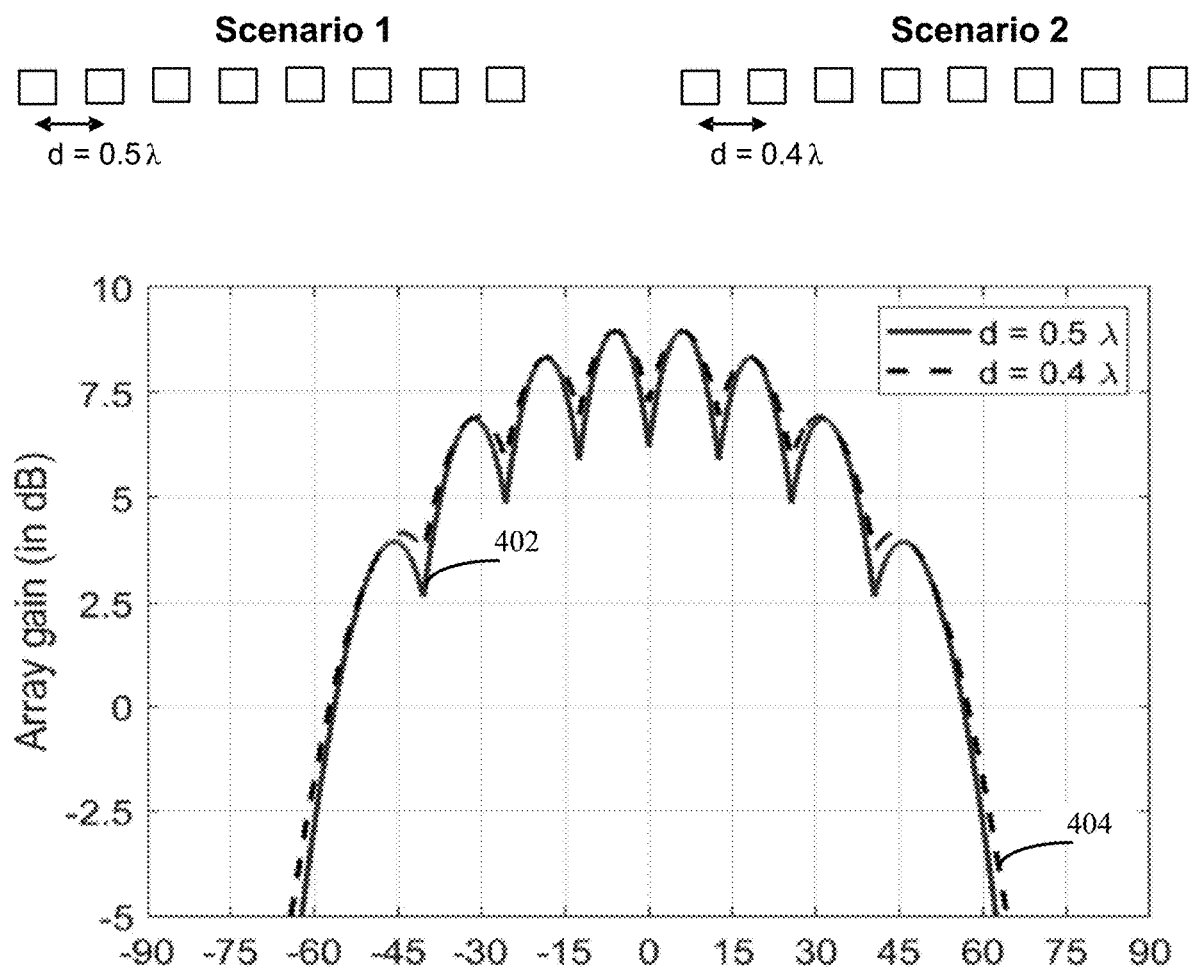
FIG. 4 illustrates a comparison of array gains for different antenna element spacings, in accordance with certain aspects of the present disclosure.

The impact of different inter-antenna element spacings is illustrated in FIG. 4. The illustrated example shows example array gains for a uniform linear array with 8 antennas using 8 directional beams with 0.5λ spacing across antenna elements (plot 402) versus a uniform linear array with 8 antennas using 8 directional beams with 0.4λ spacing across antenna elements (plot 404). As illustrated, the array gain over the scanning range (of approximately 120 degrees) shows that the 0.4λ inter-antenna element spacing is better in this case. However, there may be other tradeoffs with 0.4λ antenna element spacings, such as mutual coupling, power increase, and as a consequence, adverse thermal impact.

There are also a number of tradeoffs between uniformly spaced and non-uniformly spaced arrays and between less than 0.5λ versus greater than 0.5λ spaced arrays. For example, uniformly spaced arrays may lead to deterministic or easily predictable (e.g., using simple formulas) beam properties for main lobes, side lobes, grating lobes, beam nulls, etc., while non-uniformly spaced arrays can be used to control grating lobe/side lobe levels by appropriate inter-antenna element spacings design.

There are various other tradeoffs for different inter-antenna element spacings. For example, spacings below 0.5λ may suffer from mutual coupling issues (which may lead to reduced elemental gains), while spacings above 0.5λ can allow uncorrelated signals to be received/transmitted from antenna elements at higher elemental gains.

With an increase in inter-antenna element spacings, less antennas can be fitted within the same aperture, which may lead to reduced array gains and reduced Effective Isotropically Radiated Power (EIRP) on the uplink. When more antenna elements are used across an array, this leads to increased power consumption at the RF level and, as a result, more thermal dissipation.

Depending on the semiconductor processing node/technology used in manufacturing, there is a constraint on how many antenna elements can be gainfully used with a single RF integrated circuit (RFIC). In other words, there may be a limit on how many antenna feeds are optimally realized with an RFIC.

Finally, antenna element spacing can impact beam management latencies. For example, more antenna elements generally correspond to reduced beamwidths. Hence, there may be a need for a larger number of narrow beams to cover a given coverage region/scan angle for a larger antenna array. This, in turn, can lead to increased beam management latencies.

Figure 5:
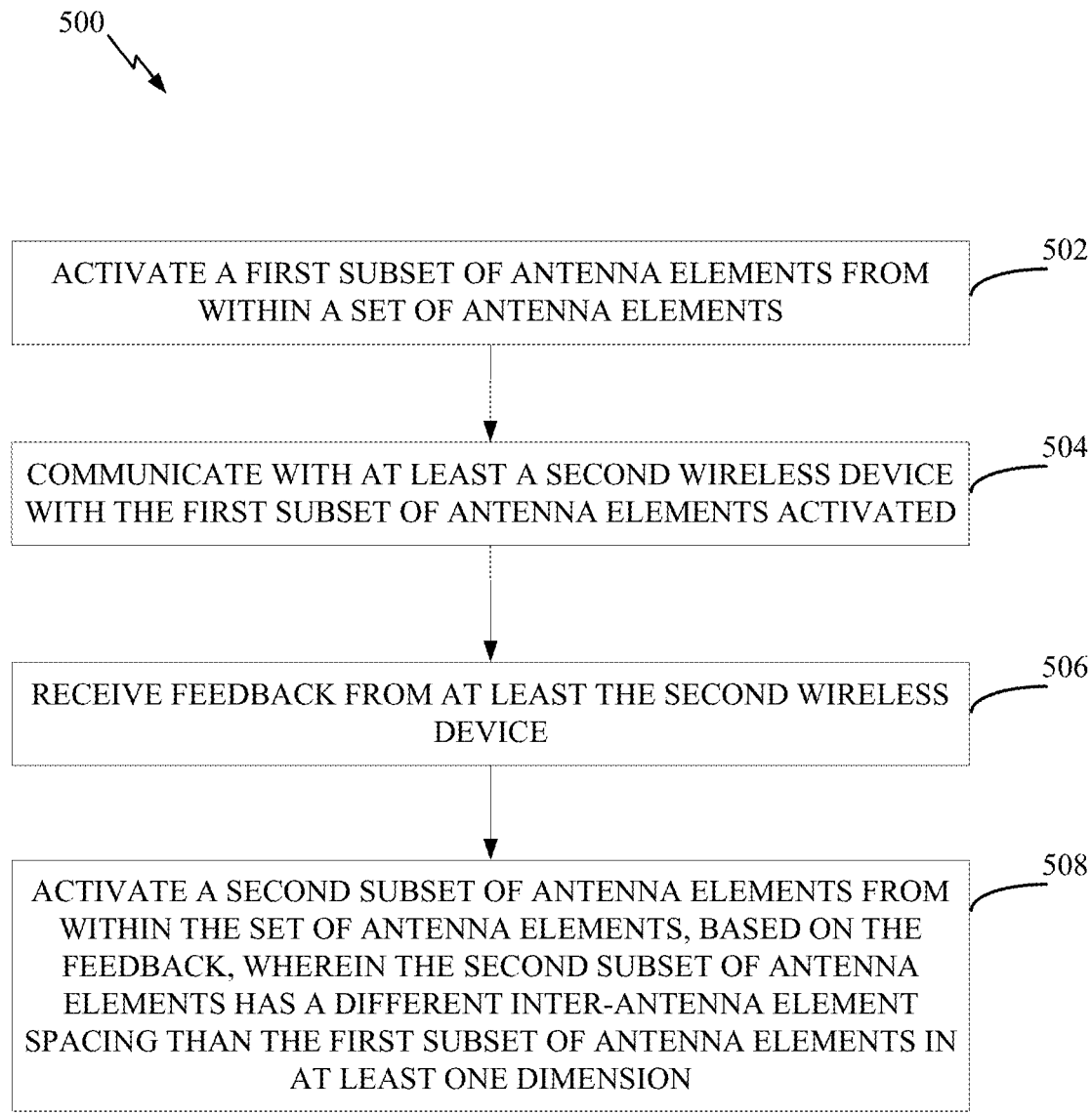
FIG. 5 illustrates example operations performed by a wireless device to adapt antenna-element spacing, in accordance with certain aspects of the present disclosure.

FIG. 5 is a flow diagram illustrating example operations 500 for adapting inter-antenna element spacing by a first wireless device, in accordance with certain aspects of the present disclosure. The operations 500 may be performed, for example, by a UE (e.g., such as a UE 120 in the wireless communication system 100) or a base station (e.g., a BS 110 in the wireless communication system 100, such as a gNB). The operations 500 may be implemented as software components that are executed and run on one or more processors (e.g., controller/processor 240 or 280 of FIG. 2). Further, the transmission and reception of signals by the UE in operations 700 may be enabled, for example, by one or more antennas (e.g., antennas 234 or 252 of FIG. 2). In certain aspects, the transmission and/or reception of signals by the UE may be implemented via a bus interface of one or more processors (e.g., controller/processor 240 or 280) obtaining and/or outputting signals.

Figure 6:
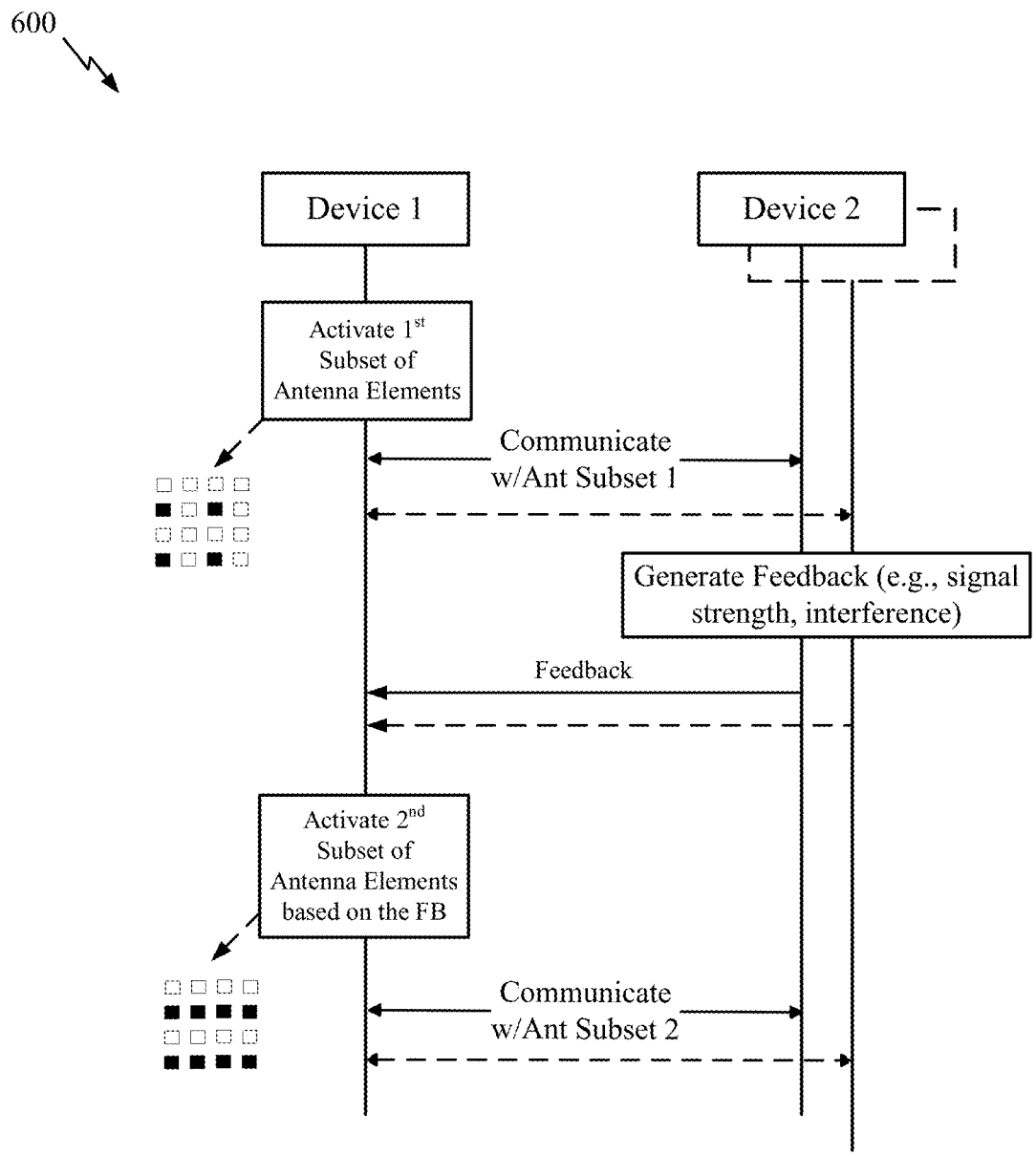
FIG. 6 is a call flow diagram illustrating an example of antenna-element spacing adaptation, in accordance with aspects of the present disclosure.

Operations 500 begin at 502, by activating a first subset of antenna elements from within a set of antenna elements. For example, referring to the call flow diagram of FIG. 6, the first wireless device (Device 1) may activate a 2×2 subset of antenna array elements with an inter-element spacing that is 2 times the inter-element spacing of a "baseline antenna array."

At 504, the first wireless device communicates with at least a second wireless device with the first subset of antenna elements activated. At 506, the first wireless device receives feedback from at least the second wireless device. For example, the second wireless device (Device 2 and possibly additional devices) may generate feedback based on received signal strength or interference measurements taken based on signals transmitted from Device 1 with the first subset of antenna elements activated.

At 508, the first wireless device activates a second subset of antenna elements from within the set of antenna elements, based on the feedback, wherein the second subset of antenna elements has a different inter-antenna element spacing than the first subset of antenna elements in at least one dimension. For example, again referring to FIG. 6, Device 1 may activate a 2×4 subset of antenna elements with a first inter-element spacing that is 2 times the inter-antenna element spacing of the baseline antenna array in one dimension and a second inter-antenna element spacing that is the same as the inter-antenna element spacing of the baseline antenna array.

A baseline antenna-array of a large number of antenna elements may have a relatively small inter-antenna element spacing between antenna elements. A wireless device can then select antenna elements from this baseline antenna array to activate and achieve inter-antenna element spacings for a desired effect.

Figure 7A:
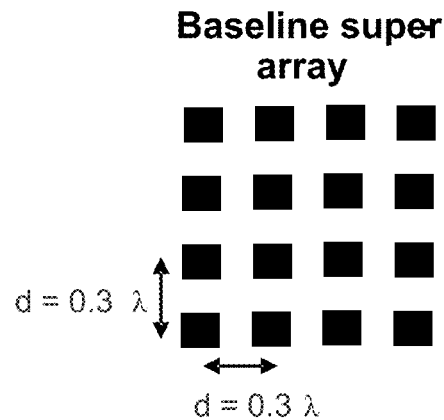
FIGS. 7A-7D illustrate different examples of antenna-element spacings, in accordance with certain aspects of the present disclosure.

For example, FIG. 7A illustrates an example of a 4×4 array with a baseline inter-antenna element spacing of 0.3λ (that is, d=0.3λ) corresponding to a physical aperture of 1.2λ×1.2λ. Different subsets of the antenna elements may be activated for different applications.

Figure 7B:
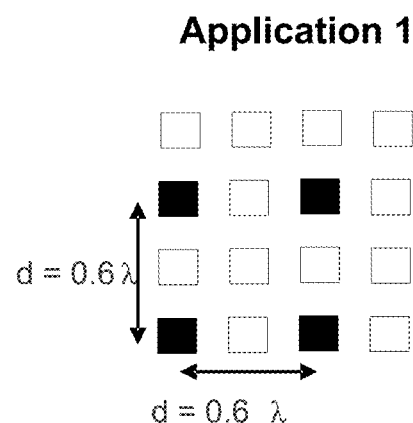

For example, as illustrated in FIG. 7B, in one application, a device may choose alternate antenna dimensions to focus on a 2×2 planar array of size 0.6λ×0.6λ (same in each 2D dimension). More specifically, Device 1 of FIG. 6 may activate the second subset of antenna elements, based on feedback, by selecting the same uniform inter-antenna element spacing for different portions of the second subset of antenna elements so as to increase array gains over a relatively narrow angular coverage region. This technique may be useful for increased array gains over a narrow coverage range.

Figure 7C:
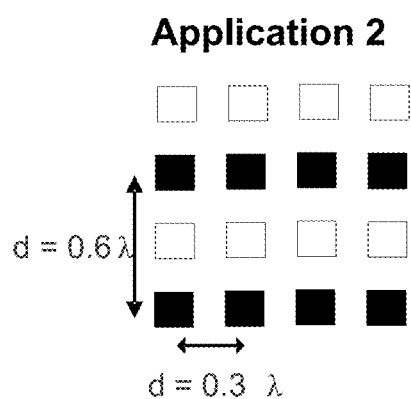

As illustrated in FIG. 7C, in a second application, a device may choose to generate a 4×2 array with a 0.3λ spacing in one direction (e.g., horizontal) and a 0.6λ spacing in another direction (e.g., vertical). More specifically, Device 1 of FIG. 6 may activate the second subset of antenna elements, based on feedback, by selecting different uniform inter-antenna element spacings for different portions of the second subset of antenna elements so as to increase array gains over a relatively broad angular coverage region. This technique may allow better array gains over a broader azimuth coverage.

Figure 7D:
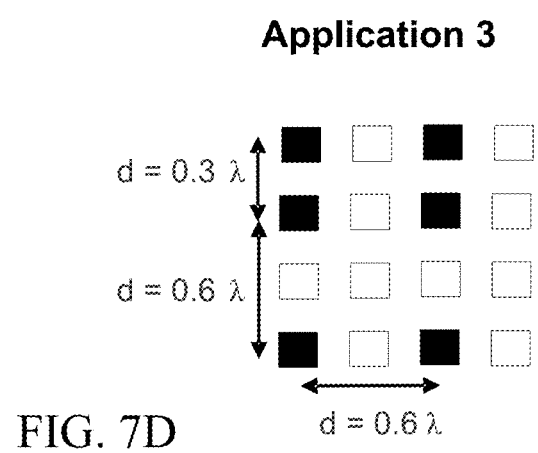

As illustrated in FIG. 7D, in a third application, the device may generate a 3×2 array with inter-antenna element spacings of 0.6λ in one direction (e.g., horizontal) and different inter-antenna element spacings in the other direction (0.6λ and 0.3λ). More specifically, Device 1 of FIG. 6 may activate the second subset of antenna elements, based on feedback, by selecting non-uniform inter-antenna element spacings in different dimensions or directions for different portions of the second subset of antenna elements so as to control side lobe(s), grating lobe(s) or both side and grating lobes. This technique may allow controlling of side/grating lobes to, e.g., mitigate interference.

Figure 8A:
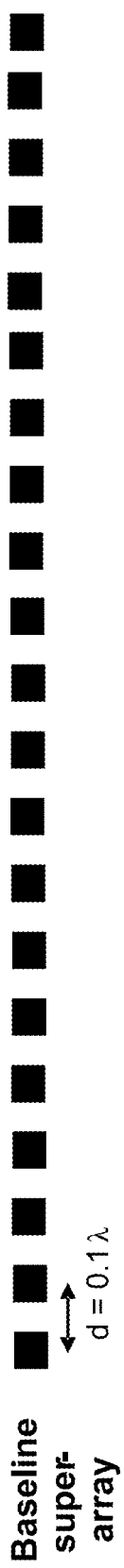
FIGS. 8A-8D illustrate different examples of antenna-element spacings, in accordance with certain aspects of the present disclosure.

In another example, FIG. 8A illustrates a 21×1 array with an inter-antenna element spacing d of 0.1λ (d=0.1λ), for example, corresponding to a physical aperture of 2.1λ. Different subsets of the antenna elements may be activated for different applications.

Figure 8B:
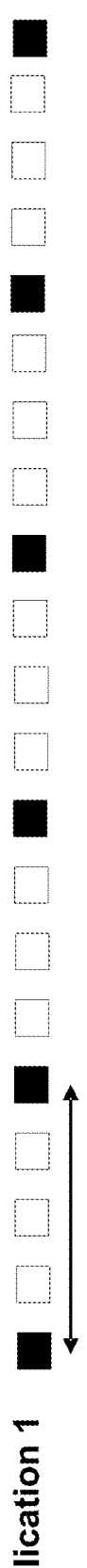
Figure 8C:
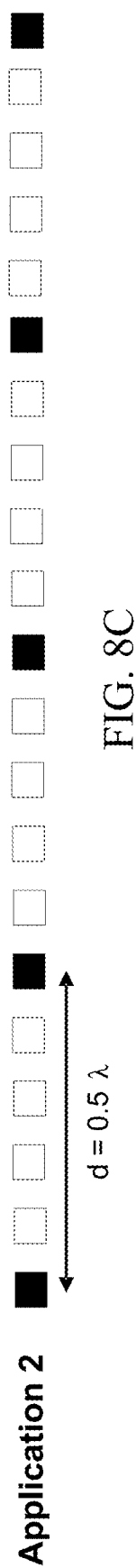
Figure 8D:
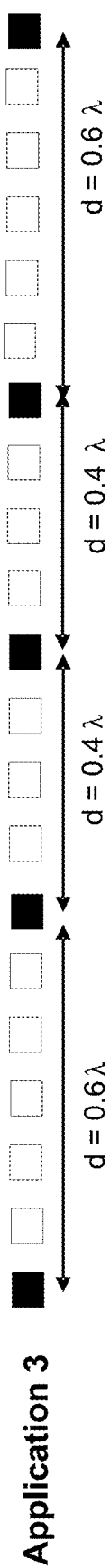

As illustrated in FIG. 8B, in one application, a device can choose to activate 1 in 4 antenna elements for an inter-antenna element spacing of d=0.4λ. In another application illustrated in FIG. 8C, the device can choose to activate 1 in 5 antenna elements for an inter-antenna element spacing of d=0.5λ. In a third application illustrated in FIG. 8D, the device may select antenna elements non-uniformly, for example, at 0.6λ and then at 0.4λ, which may help control side lobes.

As noted above, which of the various possibilities is dynamically selected may depend on the performance objectives and tradeoffs at the device. As noted above with reference to FIG. 6, the selection may also be based on feedback from another device.

This feedback may be in the form of realized signal strengths or interference from one or more other device. In some cases, feedback from a group of different devices may be jointly considered, for example, to try and select a subset of antenna elements with an inter antenna element spacing (or spacings) that optimizes coverage of the group.

Signal strengths may be captured in the form of array gain over a first spatial coverage region in analog beamforming with the chosen first set of antenna elements. Interference may be captured in the form of side lobe levels and grating lobe levels in analog beamforming over a second spatial coverage region with the chosen first set of antenna elements, where the second spatial coverage region is different from the first spatial coverage region, The device may select a second set of antenna elements that leads to different array gain or interference levels than first set of antenna elements at the second set of devices. As noted above, performance tradeoffs could also include at least one of power or thermal mitigation in changing the activation from the first set of antenna elements to the second set.

As illustrated in FIGS. 7A and 8A, the set of antenna elements from which the first and second set of antenna elements are chosen may form a baseline antenna array, which can be a uniformly spaced or non-uniformly spaced antenna array.

Figure 9:
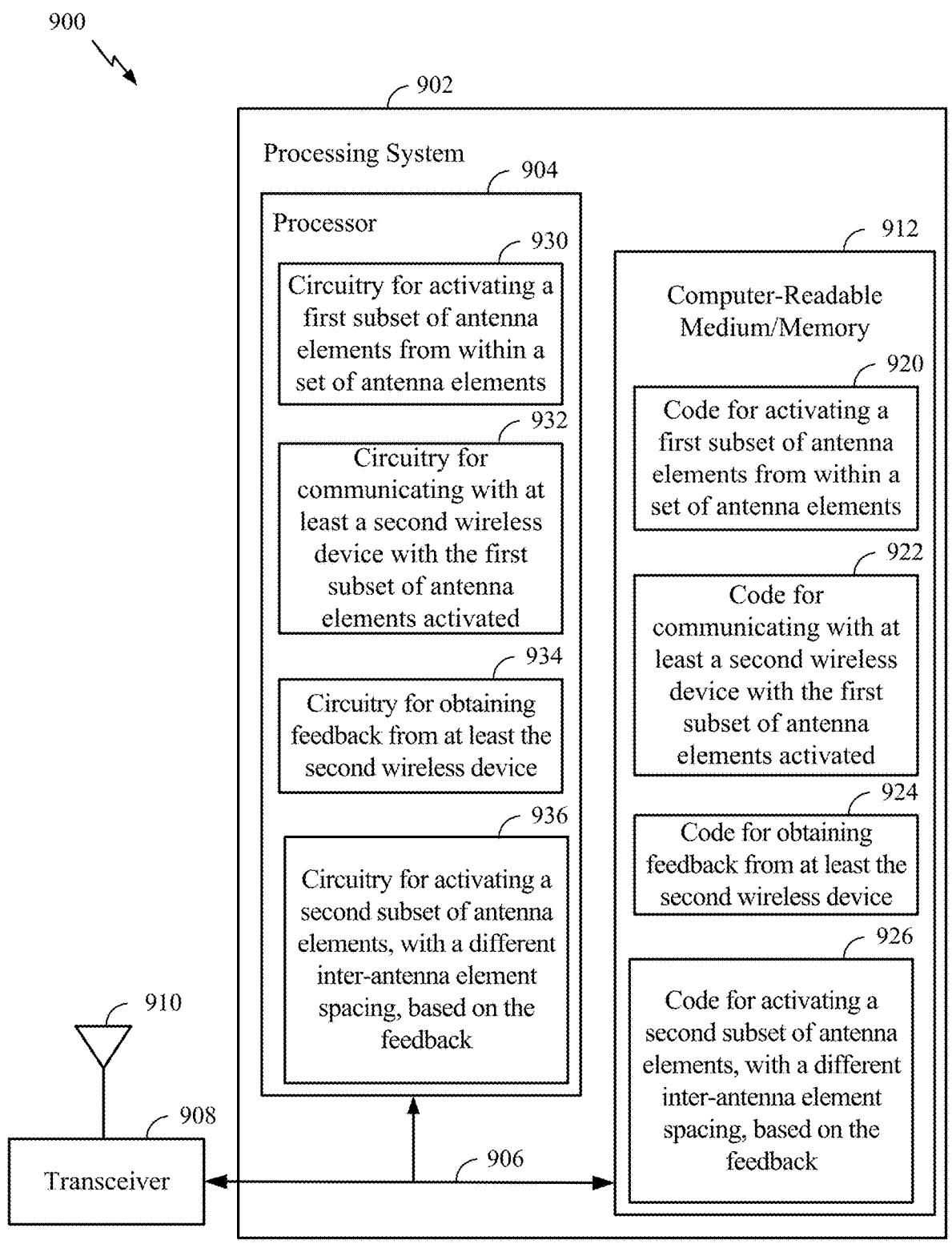
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable codes) that when executed by the processor 904, cause the processor 904 to perform the operations illustrated in FIG. 5, or other operations for performing the various techniques discussed herein. In certain aspects, computer-readable medium/memory 912 stores code 920 for activating a first subset of antenna elements from within a set of antenna elements; code 922 for communicating with at least a second wireless device with the first subset of antenna elements activated; code 924 for obtaining feedback from at least the second wireless device; and code 926 for activating a second subset of antenna elements from within the set of antenna elements, based on the feedback, wherein the second subset of antenna elements has a different inter-antenna element spacing than the first subset of antenna elements in at least one dimension. In certain aspects, the processor 904 has circuitry configured to implement the code stored in the computer-readable medium/memory 912. The processor 904 includes circuitry 930 for activating a first subset of antenna elements from within a set of antenna elements; circuitry 932 for communicating with at least a second wireless device with the first subset of antenna elements activated; circuitry 934 for obtaining feedback from at least the second wireless device; and circuitry 936 for activating a second subset of antenna elements from within the set of antenna elements, based on the feedback, wherein the second subset of antenna elements has a different inter-antenna element spacing than the first subset of antenna elements in at least one dimension.

Example Aspects

In addition to the various aspects described above, aspects of specific combinations are within the scope of the disclosure, some of which are detailed below:

Aspect 1: A method for wireless communications by a first wireless device, comprising: activating a first subset of antenna elements from within a set of antenna elements; communicating with at least a second wireless device with the first subset of antenna elements activated; receiving feedback from at least the second wireless device; and activating a second subset of antenna elements from within the set of antenna elements, based on the feedback, wherein the second subset of antenna elements has an inter-antenna element spacing different than an inter-antenna element spacing of the first subset of antenna elements in at least one dimension.

Aspect 2: The method of Aspect 1, wherein the feedback indicates one or more performance metrics when the first wireless device is communicating with the first subset of antenna elements.

Aspect 3: The method of Aspect 2, wherein the one or more performance metrics comprise at least one of a metric related to realized signal strength or a metric related to interference, as detected at the second wireless device when the first wireless device is communicating with the first subset of antenna elements.

Aspect 4: The method of Aspect 2, wherein: the one or more performance metrics comprise a metric related to realized signal strength or comprise an array gain over a spatial coverage region when the first wireless device is using analog beamforming to communicate with the first subset of antenna elements.

Aspect 5: The method of Aspect 2, wherein: the one or more performance metrics comprise a metric related to interference or comprise at least one of side lobe levels or grating lobe levels over a spatial coverage region when the first wireless device is using analog beamforming to communicate with the first subset of antenna elements.

Aspect 6: The method of Aspect 3, further comprising: receiving additional feedback from at least the second wireless device, comprising at least one of the metric related to realized signal strength or the metric related to interference, as detected at the second wireless device when the first wireless device is communicating with the second subset of antenna elements; and deciding, based on the additional feedback, whether to keep the second subset of antenna elements activated or activate a different subset of antenna elements.

Aspect 7: The method of any one of Aspects 1-6, further comprising: monitoring at least one of a power-related metric or thermal-related metric, when the first wireless device is communicating with the second subset of antenna elements; and deciding, based on the power-related metric or thermal-related metric feedback, whether to keep the second subset of antenna elements activated.

Aspect 8: The method of any one of Aspects 1-7, wherein: a first portion of the second subset of antenna elements has a first uniform inter-antenna element spacing in a first dimension; a second portion of the second subset of antenna elements has a second uniform inter-antenna element spacing in a second dimension; and the first and second uniform inter-antenna element spacings are the same.

Aspect 9: The method of Aspect 8, wherein: the second subset of antenna elements is activated, based on the feedback, to increase array gains over a relatively narrow angular coverage region; and a selection of the first and second uniform inter-antenna element spacings is based on a size of the relatively narrow angular coverage region and the array gains.

Aspect 10: The method of any one of Aspects 1-9, wherein: a first portion of the second subset of antenna elements has a first uniform inter-antenna element spacing in a first dimension; a second portion of the second subset of antenna elements has a second uniform inter-antenna element spacing in a second dimension; and the first and second uniform inter-antenna element spacings are different.

Aspect 11: The method of Aspect 10, wherein: the second subset of antenna elements is activated, based on the feedback, to increase array gains over a relatively broad angular coverage region; and a selection of the first and second uniform inter-antenna element spacings is based on a size of the relatively broad angular coverage region and the array gains.

Aspect 12: The method of any one of Aspects 1-11, wherein: a first portion of the second subset of antenna elements has a first set of non-uniform inter-antenna element spacings in a first dimension; and a second portion of the second subset of antenna elements has a second set of non-uniform inter-antenna element spacings in a second dimension.

Aspect 13: The method of Aspect 12, wherein: the second subset of antenna elements is activated, based on the feedback, to control at least one of side lobes or grating lobes; and a selection of the non-uniform inter-antenna element spacings is based on one or more characteristics of the at least one of side lobes or grating lobes.

Aspect 14: The method of any one of Aspects 1-13, wherein: the set of antenna elements from which the first and second subsets of antenna elements are activated form a baseline antenna array having inter-antenna element spacings that are either uniform or non-uniform.

Aspect 15: A first wireless device, comprising means for performing the operations of one or more of Aspects 1-14.

Aspect 16: A first wireless device, comprising a transceiver, at least one processor and memory configured to perform the operations of one or more of Aspects 1-14.

Aspect 17: An apparatus for wireless communications by a first wireless device, comprising: at least one processor; and memory coupled to the at least one processor, the memory comprising codes executable by the at least one processor to cause first wireless device to, activate a first subset of antenna elements from within a set of antenna elements, communicate with at least a second wireless device with the first subset of antenna elements activated, obtain feedback from at least the second wireless device, and activate a second subset of antenna elements from within the set of antenna elements, based on the feedback, wherein the second subset of antenna elements has an inter-antenna element spacing different than an inter-antenna element spacing of the first subset of antenna elements in at least one dimension.

Aspect 18: A computer-readable medium for wireless communications, comprising codes executable by a first wireless device to perform the operations of one or more of Aspects 1-14.

ADDITIONAL CONSIDERATIONS

The techniques described herein may be used for various wireless communications technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless device or wireless node such as a UE or a BS may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc.

Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using time division duplexing (TDD). In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 kHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). The previous description is provided to enable any person skilled in the art to practice the various aspects described herein.

Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, processors 266, 258, 264, and/or controller/processor 280 of the UE 120 and/or processors 220, 230, 238, and/or controller/processor 240 of the BS 110 shown in FIG. 2 may be configured to perform operations 500 of FIG. 5.

Means for receiving may include a receiver such as antenna(s) and/or receive processor(s) illustrated in FIG. 2. Means for transmitting may include a transmitter such as antenna(s) and/or transmit processor(s) illustrated in FIG. 2. Means for activating, means for monitoring, means for deciding and means for communicating may include a processing system, which may include one or more processors, such as processors 266, 258, 264, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a first wireless device, comprising:
   activating a first subset of antenna elements from within a set of antenna elements;
   communicating with at least a second wireless device with the first subset of antenna elements activated;
   receiving feedback from at least the second wireless device; and
   activating a second subset of antenna elements from within the set of antenna elements, based on the feedback, wherein the second subset of antenna elements has an inter-antenna element spacing different than an inter-antenna element spacing of the first subset of antenna elements in at least one dimension.

2. The method of claim 1, wherein the feedback indicates one or more performance metrics when the first wireless device is communicating with the first subset of antenna elements.

3. The method of claim 2, wherein the one or more performance metrics comprise at least one of a metric related to realized signal strength or a metric related to interference, as detected at the second wireless device when the first wireless device is communicating with the first subset of antenna elements.

4. The method of claim 3, further comprising:
   receiving additional feedback from at least the second wireless device, comprising at least one of the metric related to realized signal strength or the metric related to interference, as detected at the second wireless device when the first wireless device is communicating with the second subset of antenna elements; and
   deciding, based on the additional feedback, whether to keep the second subset of antenna elements activated or activate a different subset of antenna elements.

5. The method of claim 2, wherein:
   the one or more performance metrics comprise a metric related to realized signal strength or comprise an array gain over a spatial coverage region when the first wireless device is using analog beamforming to communicate with the first subset of antenna elements.

6. The method of claim 2, wherein:
   the one or more performance metrics comprise a metric related to interference or comprise at least one of side lobe levels or grating lobe levels over a spatial coverage region when the first wireless device is using analog beamforming to communicate with the first subset of antenna elements.

7. The method of claim 1, further comprising:
   monitoring at least one of a power-related metric or thermal-related metric, when the first wireless device is communicating with the second subset of antenna elements; and
   deciding, based on the power-related metric or thermal-related metric feedback, whether to keep the second subset of antenna elements activated.

8. The method of claim 1, wherein:
   a first portion of the second subset of antenna elements has a first uniform inter-antenna element spacing in a first dimension;
   a second portion of the second subset of antenna elements has a second uniform inter-antenna element spacing in a second dimension; and
   the first and second uniform inter-antenna element spacings are the same.

9. The method of claim 8, wherein:
   the second subset of antenna elements is activated, based on the feedback, to increase array gains over a relatively narrow angular coverage region; and
   a selection of the first and second uniform inter-antenna element spacings is based on a size of the relatively narrow angular coverage region and the array gains.

10. The method of claim 1, wherein:
    a first portion of the second subset of antenna elements has a first uniform inter-antenna element spacing in a first dimension;
    a second portion of the second subset of antenna elements has a second uniform inter-antenna element spacing in a second dimension; and
    the first and second uniform inter-antenna element spacings are different.

11. The method of claim 10, wherein:
the second subset of antenna elements is activated, based on the feedback, to increase array gains over a relatively broad angular coverage region; and
a selection of the first and second uniform inter-antenna element spacings is based on a size of the relatively broad angular coverage region and the array gains.

12. The method of claim 1, wherein:
a first portion of the second subset of antenna elements has a first set of non-uniform inter-antenna element spacings in a first dimension; and
a second portion of the second subset of antenna elements has a second set of non-uniform inter-antenna element spacings in a second dimension.

13. The method of claim 12, wherein:
the second subset of antenna elements is activated, based on the feedback, to control at least one of side lobes or grating lobes; and
a selection of the non-uniform inter-antenna element spacings is based on one or more characteristics of the at least one of side lobes or grating lobes.

14. The method of claim 1, wherein:
the set of antenna elements from which the first and second subsets of antenna elements are activated form a baseline antenna array having inter-antenna element spacings that are either uniform or non-uniform.

15. A first wireless device, comprising:
at least one processor;
memory coupled to the at least one processor, the memory comprising codes executable by the at least one processor to cause first wireless device to:
activate a first subset of antenna elements from within a set of antenna elements; and
communicate with at least a second wireless device with the first subset of antenna elements activated; and
a receiver configured to receive feedback from at least the second wireless device, wherein:
the memory further comprises code executable by the at least one processor to cause first wireless device to activate a second subset of antenna elements from within the set of antenna elements, based on the feedback, wherein the second subset of antenna elements has an inter-antenna element spacing different than an inter-antenna element spacing of the first subset of antenna elements in at least one dimension.

16. The first wireless device of claim 15, wherein the feedback indicates one or more performance metrics when the first wireless device is communicating with the first subset of antenna elements.

17. The first wireless device of claim 16, wherein the one or more performance metrics comprise at least one of a metric related to realized signal strength or a metric related to interference, as detected at the second wireless device when the first wireless device is communicating with the first subset of antenna elements.

18. The first wireless device of claim 17, wherein:
the receiver is further configured to receive additional feedback from at least the second wireless device, comprising at least one of the metric related to realized signal strength or the metric related to interference, as detected at the second wireless device when the first wireless device is communicating with the second subset of antenna elements; and
the memory further comprises code executable by the at least one processor to cause first wireless device to decide, based on the additional feedback, whether to keep the second subset of antenna elements activated or activate a different subset of antenna elements.

19. The first wireless device of claim 16, wherein:
the one or more performance metrics comprise a metric related to realized signal strength or comprise an array gain over a spatial coverage region when the first wireless device is using analog beamforming to communicate with the first subset of antenna elements.

20. The first wireless device of claim 16, wherein:
the one or more performance metrics comprise a metric related to interference or comprise at least one of side lobe levels or grating lobe levels over a spatial coverage region when the first wireless device is using analog beamforming to communicate with the first subset of antenna elements.

21. The first wireless device of claim 15, wherein the memory further comprises codes executable by the at least one processor to cause first wireless device to:
monitor at least one of a power-related metric or thermal-related metric, when the first wireless device is communicating with the second subset of antenna elements; and
decide, based on the power-related metric or thermal-related metric feedback, whether to keep the second subset of antenna elements activated.

22. The first wireless device of claim 15, wherein:
a first portion of the second subset of antenna elements has a first uniform inter-antenna element spacing in a first dimension;
a second portion of the second subset of antenna elements has a second uniform inter-antenna element spacing in a second dimension; and
the first and second uniform inter-antenna element spacings are the same.

23. The first wireless device of claim 22, wherein:
the second subset of antenna elements is activated, based on the feedback, to increase array gains over a relatively narrow angular coverage region; and
a selection of the first and second uniform inter-antenna element spacings is based on a size of the relatively narrow angular coverage region and the array gains.

24. The first wireless device of claim 15, wherein:
a first portion of the second subset of antenna elements has a first uniform inter-antenna element spacing in a first dimension;
a second portion of the second subset of antenna elements has a second uniform inter-antenna element spacing in a second dimension; and
the first and second uniform inter-antenna element spacings are different.

25. The first wireless device of claim 24, wherein:
the second subset of antenna elements is activated, based on the feedback, to increase array gains over a relatively broad angular coverage region; and
a selection of the first and second uniform inter-antenna element spacings is based on a size of the relatively broad angular coverage region and the array gains.

26. The first wireless device of claim 15, wherein:
a first portion of the second subset of antenna elements has a first set of non-uniform inter-antenna element spacings in a first dimension; and
a second portion of the second subset of antenna elements has a second set of non-uniform inter-antenna element spacings in a second dimension.

27. The first wireless device of claim 26, wherein:
the second subset of antenna elements is activated, based on the feedback, to control at least one of side lobes or grating lobes; and
a selection of the non-uniform inter-antenna element spacings is based on one or more characteristics of the at least one of side lobes or grating lobes.

28. The first wireless device of claim 15, wherein:
the set of antenna elements from which the first and second subsets of antenna elements are activated form a baseline antenna array having inter-antenna element spacings that are either uniform or non-uniform.

* * * * *